(No Model.)
E. S. LEAYCRAFT.
BICYCLE BRAKE.
No. 580,619. Patented Apr. 13, 1897.
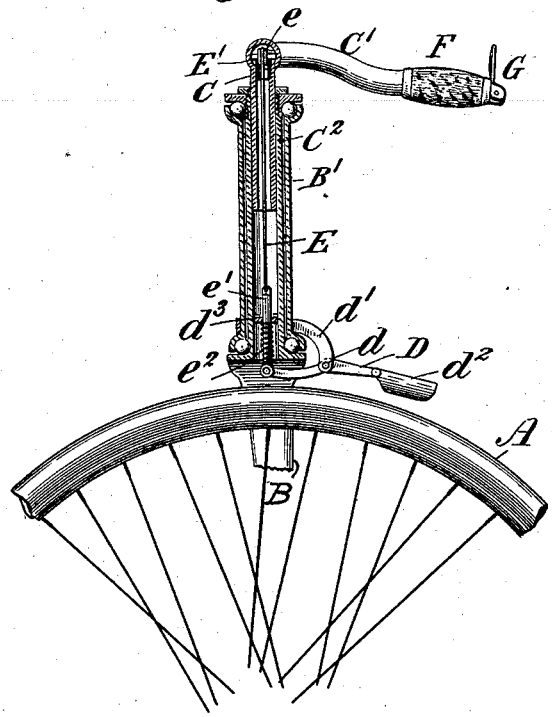
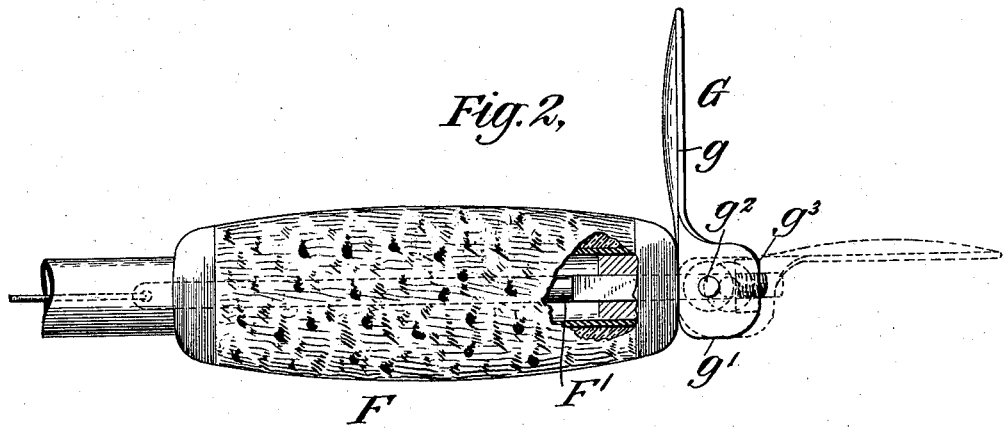
WITNESSES:
INVENTOR
Edwin S. Leaycraft,
BY Pierson L. Wells,
HIS ATTORNEY.

UNITED STATES PATENT OFFICE.

EDWIN S. LEAYCRAFT, OF JERSEY CITY, NEW JERSEY.

BICYCLE-BRAKE.

SPECIFICATION forming part of Letters Patent No. 580,619, dated April 13, 1897.

Application filed November 18, 1895. Serial No. 569,308. (No model.)

*To all whom it may concern:*

Be it known that I, EDWIN S. LEAYCRAFT, of Jersey City, New Jersey, have invented a certain new and useful Improvement in Bicycle-Brakes, of which the following is a specification.

The present improvement relates to a brake mechanism for a bicycle the hand-operated member of which is arranged adjacent to a handle of the bicycle steering-gear and whose remaining mechanism extending to and connecting with the brake-shoe support is wholly inclosed within the steering-gear.

The improvement embraces a brake mechanism of simple construction and one easily and quickly brought into action.

I will describe a bicycle-brake in which are embodied the features of my improvement, and then point out the novelty in claims.

In the accompanying drawings, Figure 1 is a vertical longitudinal section through the stem of a bicycle handle-bar, showing a portion of the bicycle only and represents my improvement. Fig. 2 is a view of the handle and handle portion of the bicycle handle-bar represented in Fig. 1, but showing the same on a larger scale.

Similar letters of reference designate corresponding parts in both figures.

Referring to the drawings, A designates the front or leading wheel of the bicycle, and B the steering-fork. The stem C, extending from the bicycle handle-bars C', is secured to the shank $C^2$ of the steering-fork, which is mounted in the socket formed in the head B'. The piece $C^2$, the head B', the stem C, and the handle-bar C' are hollow.

D is a lever fulcrumed at $d$ to a bracket $d'$, extending from the head B'. At its outer extremity the lever D supports a brake-shoe $d^2$, adapted to bear against the wheel A, while to the inner extremity of the lever there is secured a connector E, which may consist of cord or wire extending upward through the head B' and the stem C, over a pulley $e$ at the upper portion of the stem, and finally outward through the handle-bar C'.

The lower portion of the connector E adjacent the lever D may consist of a rod $e'$, as shown.

Means for holding the shoe $d^2$ normally elevated from the wheel are provided, consisting of a helical spring $e^2$, interposed between a fixed shoulder $d^3$ and a fixture of the connector E.

A convenient mounting for the pulley $e$ will be that afforded by a tube E', at the upper end of which the axis of the pulley is journaled and which is then inserted within the stem.

F is a steering-gear handle secured to the bicycle handle-bar. To the outer end of the connector E, before mentioned, is secured a rod F'. Preferably this rod is of angular cross-section, and it is fitted to slide lengthwise in the end portion of the handle F.

G is a handpiece designed to be moved by the hand into an off or an on position to move the brake-shoe to a corresponding position. The handpiece G will preferably consist of a piece of sheet metal, as, for instance, steel, pressed, forged, or bent to an appropriate shape. The piece as represented consists of a body portion $g$ and integral extensions bent laterally to form cheeks $g'$. In the cheek-pieces $g'$ there are journaled the extremities of a block $g^2$. The rod F', before described as being attached to the connector E, is secured to the block $g^2$, so that when the latter is moved away from the handle the connector will be strained and the brake will be actuated. Preferably the connection between the block and the rod F' will be such that the two may be relatively adjusted. In this instance the end of the rod F' is threaded and a nut $g^3$ applied to the threaded portion.

The piece G can assume either of two positions, one of which (shown in full lines in Fig. 2) corresponds to a released position of the brake and the other of which (shown in dotted lines) corresponds to an application of the brake. The construction is such that the piece may be moved from the one to the other position by a slight blow or movement of the hand, thus permitting the brake to be readily and quickly applied.

To enable the piece G to be firmly held in either position, I slightly hollow the surfaces constituting the bearing-surfaces in the two positions of the piece, if the end of the handle F is convex.

It will be noticed that the distance from the journal of the block $g^2$ to the bearing-surface at the side of the handpiece or that in use when the brake is released is less than the corresponding distance between the journal and the bearing-surface at the end of the piece or that in use when the brake is applied. It is evident that this construction gives the necessary longitudinal movement of the connector E for applying the brake.

The handpiece G is in effect a cam whose position controls the position of the brake-shoe and which is in the form illustrated adapted to remain in the position to which it may be moved.

The connection, as described, between the block $g^2$ and the rod F' is such that the position of the shoe may be adjusted relatively to the wheel A for the same position of the handpiece G.

If the rod F' is made of a length permitting its total withdrawal from its bearing in the end of the handle F upon exerting an abnormal pull on the handpiece G, then when so withdrawn the handpiece may be turned to point in another direction and the rod F' reengaged with its bearing in the handle.

Having described my invention, what I consider as new, and desire to secure by Letters Patent, is—

1. The combination, in a bicycle, with a brake-shoe, a support therefor, and a piece fitted to move lengthwise of the bicycle-handle, of a connector placing said support in operative connection with the aforesaid piece, and a handpiece, or lever consisting of a body portion and lateral extensions and having surfaces adapted to bear against the end of the bicycle-handle, the aforesaid piece having a hinged connection with the extensions of the handpiece or lever, and the bearing-surfaces on the latter being arranged at different distances from the point of connection of the aforesaid piece with the handpiece or lever, substantially as and for the purpose set forth.

2. The combination, in a bicycle, with a brake-shoe, a support therefor, and a piece fitted to move lengthwise of the bicycle-handle, of a connector placing said support in operative connection with the aforesaid piece, and a handpiece, or lever, consisting of a body portion and lateral extensions and having surfaces adapted to bear against the end of the bicycle-handle, the aforesaid piece having a hinged, adjustable connection with the extensions of the handpiece, or lever, and the bearing-surfaces on the latter being arranged at different distances from the point of connection of the aforesaid piece with the handpiece, or lever, substantially as and for the purpose set forth.

In witness whereof I have signed my name in the presence of two subscribing witnesses.

EDWIN S. LEAYCRAFT.

Witnesses:
JOHN P. LA FORGE,
CHARLES MAXFIELD.